United States Patent
Dunlow (12)

(10) Patent No.: US 6,322,845 B1
(45) Date of Patent: Nov. 27, 2001

(54) METHOD FOR PRODUCING PELLETIZED FUZZY COTTONSEED

(76) Inventor: Ernest Michael Dunlow, 203 Rollingwood Rd., Roanoke Rapids, NC (US) 27870

(*) Notice: Subject to any disclaimer, the term of this patent is extended or adjusted under 35 U.S.C. 154(b) by 0 days.

(21) Appl. No.: 09/585,795

(22) Filed: Jun. 3, 2000

(51) Int. Cl.$^7$ ................ A23L 1/36; A23P 1/06; A23P 1/12; A23K 9/00; A23B 9/14
(52) U.S. Cl. .............. 426/629; 426/630; 426/635; 426/640; 426/454; 426/516; 426/93; 426/302; 426/310
(58) Field of Search .................... 426/635, 454, 426/630, 516, 807, 520, 74, 93, 310, 629

(56) References Cited

U.S. PATENT DOCUMENTS

| | | | |
|---|---|---|---|
| 2,168,532 | * 8/1939 | McMath et al. | 426/542 |
| 3,972,861 | 8/1976 | Gardner, Jr. et al. | 260/123.5 |
| 4,022,915 | * 5/1977 | Zukerman | 426/72 |
| 4,034,120 | 7/1977 | Wortham et al. | 426/531 |
| 4,055,680 | 10/1977 | Duke | 426/635 |
| 4,062,988 | 12/1977 | De Santis | 426/656 |
| 4,084,007 | 4/1978 | Hipp et al. | 426/430 |
| 4,132,807 | 1/1979 | Duke | 426/2 |
| 4,201,709 | 5/1980 | Kadan et al. | 260/123.5 |
| 4,279,811 | 7/1981 | Gray et al. | 260/123.5 |
| 4,803,085 | * 2/1989 | Findley | 426/69 |
| 5,204,102 | 4/1993 | Coles et al. | 424/195.1 |
| 5,270,062 | * 12/1993 | Buchs | 426/72 |
| 5,363,754 | 11/1994 | Coles et al. | 99/484 |
| 5,589,186 | * 12/1996 | Isobe et al. | 424/438 |
| 5,750,466 | 5/1998 | Wedegaertner et al. | 504/100 |
| 6,016,742 | * 1/2000 | Hauck et al. | 99/348 |

FOREIGN PATENT DOCUMENTS

05041953 * 2/1993 (JP).

* cited by examiner

Primary Examiner—Milton I. Cano
Assistant Examiner—Robert Madsen
(74) Attorney, Agent, or Firm—Michael I. Kroll

(57) ABSTRACT

The invention is a method for producing pelletized whole fuzzy cottonseed. The method comprises selectively delivering a measured amount of linted cottonseed to a screw extruder. The screw extruder having a bore and screw that decreases in diameter from one distal end to the other. Thereby, the linted cottonseed is subjected to predetermined increases in pressure and ground to a pasty oatmeal-like consistency before being extruded at the output end to a delivery system feeding the pellet forming mechanism having as its output pelletized linted cottonseed.

1 Claim, 4 Drawing Sheets

METHOD FOR PRODUCING PELLETIZED FUZZY COTTONSEED

BACKGROUND OF THE INVENTION

1. Field of the Invention

The present invention relates generally to fuzzy cottonseed processing and, more specifically, to a method for producing pelletized whole fuzzy cottonseed. The method comprises means for selectively delivering a measured amount of linted cottonseed to a screw extruder. The screw extruder having a bore and screw that decreases in diameter from one distal end to the other. Thereby, the linted cottonseed is subjected to predetermined increases in pressure and ground to a pasty oatmeal-like consistency before being extruded at the output end to a delivery system feeding the pellet forming mechanism having as its output pelletized linted cottonseed.

2. Description of the Prior Art

There are other linted cottonseed processes designed for using cottonseed as a food. Typical of these is U.S. Pat. No. 3,972,861 issued to Gardner, Jr. et al. on Aug. 3. 1976.

Another patent was issued to Worthman et al. on Jul. 5, 1977 as U.S. Pat. No. 4,034,120. Yet another U.S. Pat. No. 4,055,680 was issued to Duke on Oct. 25, 1977 and still yet another was issued on Dec. 13, 1977 to De Santis as U.S. Pat. No. 4,062,988.

Another patent was issued to Hipp et al. on Apr. 11, 1978 as U.S. Pat. No. 4,084,007. Yet another U.S. Pat. No. 4,132,807 was issued to Duke on Jan. 2, 1979. Another was issued to Kadan et al. on May 6, 1980 as U.S. Pat. No. 4,201,709 and still yet another was issued on Jul. 21, 1981 to Gray et al. as U.S. Pat. No. 4,279,811.

Another patent was issued to Coles et al. on Apr. 20, 1993 as U.S. Pat. No. 5,204,102. Yet another U.S. Pat. No. 5,363,754 was issued to Coles et al. on Nov. 15, 1994 and still yet another was issued on May 12, 1998 to Wedegaertner et al. as U.S. Pat. No. 5,750,466.

U.S. Pat. No. 3,972,861

Inventor: Homer K. Gardner, Jr. et al.

Issued: Aug. 3, 1976

An edible high-protein flour is produced by an improved process. Cottonseed meats are dried, and then comminuted in a wide chamber mill having certain specifications which prevent rupturing the pigment glands of the cottonseed. This improvement is correlated with liquid cyclone separation followed by solids recovery steps, thus comprising an improved process which consistently yields an edible cottonseed protein concentrate.

U.S. Pat. No. 4,034,120

Inventor: Joseph Sidney Wortham et al.

Issued: Jul. 5, 1977

The pelleting of fibrous agricultural material, such as beet pulp is facilitated by the incorporation of a mixture of expanded vermiculite and/or finely divided vermiculite ore with an organic material which may be animal fat or a vegetable oil product such as cottonseed oil.

U.S. Pat. No. 4,055,680

Inventor: Gene L. Duke

Issued: Oct. 25, 1977

Lint removed from cottonseed by dry acid is compacted by pelletizing in a standard pellet mill.

U.S. Pat. No. 4,062,988

Inventor: Stanislao A. DeSantis

Issued: Dec. 13, 1977

Molasses, a fatty acid soap former such as yellow grease, a hard metallic soap former such as calcium oxide and a natural protein source such as cottonseed meal are blended and mixed to obtain a nutrient composition which sets to a hard block.

U.S. Pat. No. 4,084,007

Inventor: James P. Hipp

Issued: Apr. 11, 1978

An improved process for producing a high quality, edible meal product from cottonseed by releasing oil under conditions whereby unruptured gossypol cells are loated out with the oil flow and immediately separated from the remaining solids. Sufficient gossypol is removed in the cooking step of the extraction phase by a simple, low temperature heat and moisture treatment so that the final meal product rendered is safe and nutritious for human consumption, yet produced at lower cost than prior art methods. The dry, decortiated oleaginous material is treated in a flow down cooker where heat and moisture are added for removal of a significant portion of the oil and gossypol therein, after which the material is mixed with a solvent for removal of the major portion of the remaining oil and gossypol. The material is then separated from the mixture of solvent and removed oil and gossypol in an extracting or washing apparatus after which the material is treated in a desolventizer or removal of the remaining solvent, leaving a meal with a low gossypol and fat content.

U.S. Pat. No. 4,132,807

Inventor: Gene L. Duke

Issued: Jan. 2, 1979

Lint removed from cottonseed by dry acid is compacted by pelletizing in a standard pellet mill.

U.S. Pat. No. 4,201,709

Inventor: Ranjit S. Kadan et al.

Issued: May 6, 1980

A low-gossypol, high-protein flour is produced by a process which utilizes conventional solvent extraction equipment with a certain series of steps, culminating at a oint where a defatted, milled, cottonseed flour mixture is rendered edible for human consumption by the separation of the gossypol-containing portion.

U.S. Pat. No. 4,279,811

Inventor: Marie S. Gray et al.

Issued: Jul. 21, 1981

A low gossypol, high protein cottonseed product is produced by passing cottonseed meal through a certain series of steps utilizing conventional solvent extraction quipment, and culminating at a point where the cottonseed meal is rendered edible—for human consumption and animal feed—by disruption of gossypol glands and xtraction of gossypol pigments.

U.S. Pat. No. 5,204,102

Inventor: Richard G. Coles et al.

Issued: Apr. 20, 1993

An animal feedstuff comprising fluffy cotton seed coated with a binder selected from molasses, gum, starch and lignasite in an amount of 1–10% by weight, a filler elected from calcium carbonate, diatomaceous earth, bentonite, lime, kaolin, extruded and textured proteins, ground cereal grains and mixtures thereof in an amount f 10–50% by weight, and animal maintenance additives selected from vitamins, minerals, trace elements, veterinarian products for the prevention, control or radication of disease, and growth stimulating factors in an amount of 0–5% by weight.

U.S. Pat. No. 5,363,754

Inventor: Richard G. Coles et al.

Issued: Nov. 15, 1994

A method and apparatus to convert fluffy cotton seed to an animal feedstuff, comprises delinting the fluffy cotton seed to remove lint and tails therefrom, coating the elinted cotton seed with a binder, adding a filler to the cotton seed coated with the binder, and drying the coated cotton seed to produce a flowable product. The method and apparatus converts a hitherto waste product to a valuable commercial product.

U.S. Pat. No. 5,750,466

Inventor: Thomas C. Wedgegaertner et al.

Issued: May 12, 1998

Linter-bearing cottonseed covered with a coat of starch optionally containing one or more biologically related materials selected from vitamins, feed supplements, oils, fats, urea, rodent repellants, insect repellants, medications, anti-germination agents, and preservatives, and a method for preparing it is taught herein. Starch coated cottonseed is useful as an animal feed and as planting stock. The starch coating allows the cottonseed to be used in conventional feed handling and seed linting equipment.

While these linted cottonseed processes may be suitable for the purposes for which they were designed, they would not be as suitable for the purposes of the present invention, as hereinafter described.

SUMMARY OF THE PRESENT INVENTION

A primary object of the present invention is to provide a method for pelletizing linted cottonseed.

Another object of the present invention is to provide a method for pelletizing linted cottonseed having storage holding means for linted cottonseed.

Yet another object of the present invention is to provide a method for pelletizing linted cottonseed having flowrate means for moving linted cottonseed from the storage holding means to a screw extruder.

Still yet another object of the present invention is to provide a method for pelletizing linted cottonseed having a screw extruder having an input port for introducing a measured amount of linted cottonseed and an output port for extruding a measured amount of linted cottonseed.

Another object of the present invention is to provide a method for pelletizing linted cottonseed having a screw extruder having a bore decreasing in diameter from the input port to the output port.

Yet another object of the present invention is to provide a method for pelletizing linted cottonseed having a screw extruder having a helical blade decreasing in diameter from the input port to the output port.

Still yet another object of the present invention is to provide a method for pelletizing linted cottonseed having a screw extruder having a helical blade that will grind linted cottonseed into a blend mixture.

Another object of the present invention is to provide a method for pelletizing linted cottonseed having a screw extruder wherethrough the cottonseed blend temperature will increase from the input port to the output port.

Yet another object of the present invention is to provide a method for pelletizing linted cottonseed wherethrough the free cottonseed oil pigment gossypol will bind with constituent cottonseed elements reducing the amount of free gossypol.

Still yet another object of the present invention is to provide a method for pelletizing linted cottonseed having a pellet forming mechanism.

Another object of the present invention is to provide a method for pelletizing linted cottonseed having a pellet forming mechanism having an input port for introducing the linted cottonseed blend and an output port for the pelletized linted cottonseed blend.

Yet another object of the present invention is to provide a method for pelletizing linted cottonseed that will provide a whole cottonseed product that can be handled by traditional grain handling equipment.

Still yet another object of the present invention is to provide a method for pelletizing linted cottonseed that produces a whole cottonseed product that does not require the introduction of additives, such as coatings.

Another object of the present invention is to provide a method for pelletizing linted cottonseed where nutritional ingredients can be introduced into the blend creation process that will permeate throughout the blend pellet.

Yet another object of the present invention is to provide a method for pelletizing linted cottonseed where coatings can be introduced after the pellet forming processing to protect against insect, vermin and to extent the shelf life of the pellets.

Additional objects of the present invention will appear as the description proceeds.

The present invention overcomes the shortcomings of the prior art by providing a method for processing whole fuzzy cottonseed into animal feed pellets. The primary steps of mincing the cottonseed until the hulls and attached lint having been broken down and increasing the pressure before extruding so that the mixture achieves a mash-like consistency enables the forming of pellets.

These whole fuzzy cottonseed pellets have the same nutritional value as before the pellet process and can be handled by machinery used to process grain products. In addition to the handling capabilities, the pellets are a densified form of whole fuzzy cottonseed as opposed to unprocessed whole fuzzy cottonseed or coated whole fuzzy cottonseed.

Furthermore, because the whole fuzzy cottonseed is reduced to a blend the introduction of enrichments such as, vitamins, feed supplements and medications will attain a consistency throughout the pellet which is not possible with coated seeds. Also, the use of rodent and insect repellants can be applied as a coating after pelletizing the whole fuzzy cottonseed.

In addition the introduction of binding agents for the cottonseed pigment gossypol would provide a feed of ad libitum intake.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

LIST OF REFERENCE NUMERALS UTILIZED IN THE DRAWINGS 10 method for producing pelletized fuzzy cottonseed
12 whole fuzzy cottonseed holding means
14 whole fuzzy cottonseed metering means
16 whole fuzzy cottonseed cleaning means
18 delivery means
20 whole fuzzy cottonseed pulverizing means
22 whole fuzzy cottonseed mash delivery means
24 whole fuzzy cottonseed pelleting means
26 whole fuzzy cottonseed pelleting delivery means
28 whole fuzzy cottonseed pellet cooling means
30 fuzzy cottonseed storage delivery means
32 whole fuzzy cottonseed storing means
34 select whole fuzzy cottonseed
36 convey whole fuzzy cottonseed to extruder
38 mince whole fuzzy cottonseed
40 extrude whole fuzzy cottonseed mash
42 convey whole fuzzy cottonseed mash to pelletizer
44 pelletize whole fuzzy cottonseed mash
46 convey whole fuzzy cottonseed pellets to cooler
48 cool whole fuzzy cottonseed pellets
50 convey whole fuzzy cottonseed pellets to storage
52 steps for making whole fuzzy cottonseed pellets
54 steps for making enriched whole fuzzy cottonseed pellets
56 adding beneficial enrichment to whole fuzzy cottonseed mash
58 adding coating to whole fuzzy cottonseed pellets

BRIEF DESCRIPTION OF THE DRAWING FIGURES

In order that the invention may be more fully understood, it will now be described, by way of example, with reference to the accompanying drawing in which.

DETAILED DESCRIPTION OF THE PREFERRED EMBODIMENT

Figure 1:
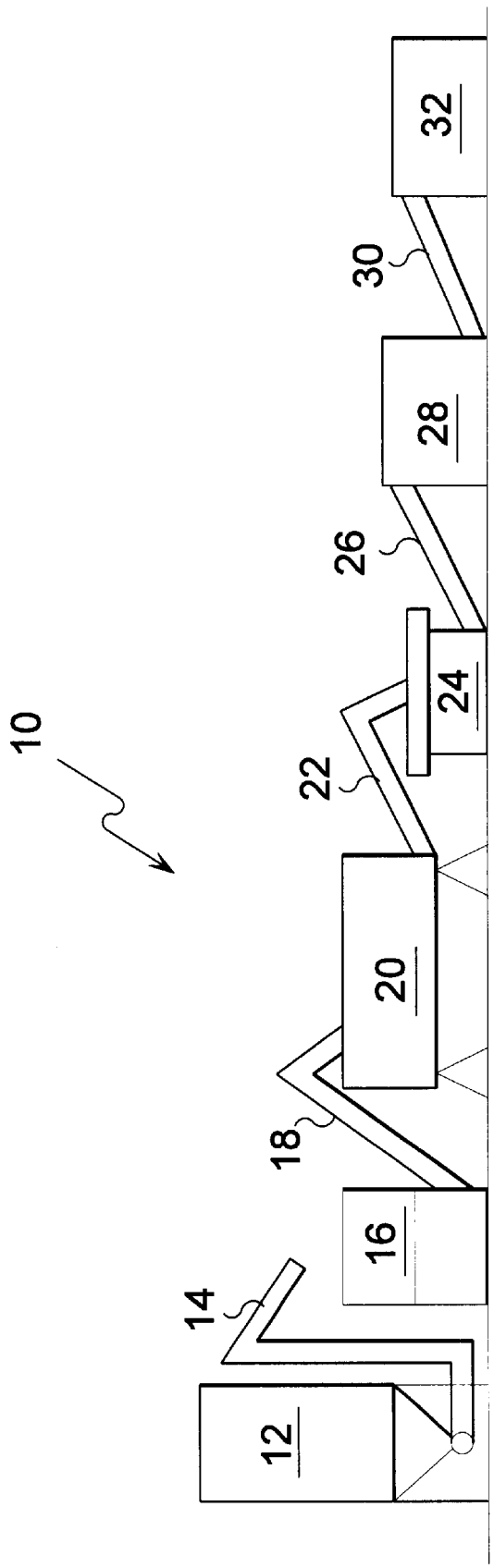
FIG. 1 is an illustrative view of the present invention. Showing one means for making pelletized whole fuzzy cottonseed.

Turning now descriptively to the drawings in which similar reference characters denote similar elements throughout the drawing figures. FIG. 1 through FIG. 4 illustrate the method for producing pelletized whole fuzzy cottonseed of the present invention indicated generally by the numeral 10.

Referring to FIG. 1, after ginning cotton the linted cottonseeds are transported to a holding bin 12. These cottonseeds are the raw material for the pelletizing process. The cottonseed is conveyed at a predetermined volume 14 to a screening device 16 for the removal of foreign materials. The screened cottonseed are conveyed 18 to a screw extruder 20. The screw extruder minces the whole fuzzy cottonseed increasing the atmospheric pressure as the minced cottonseed progresses toward the outlet port. The minced mixture under increasing atmospheric pressure crushes the mixture into a whole fuzzy cottonseed mash which has elevated in temperature under increasing pressure.

Figure 2:
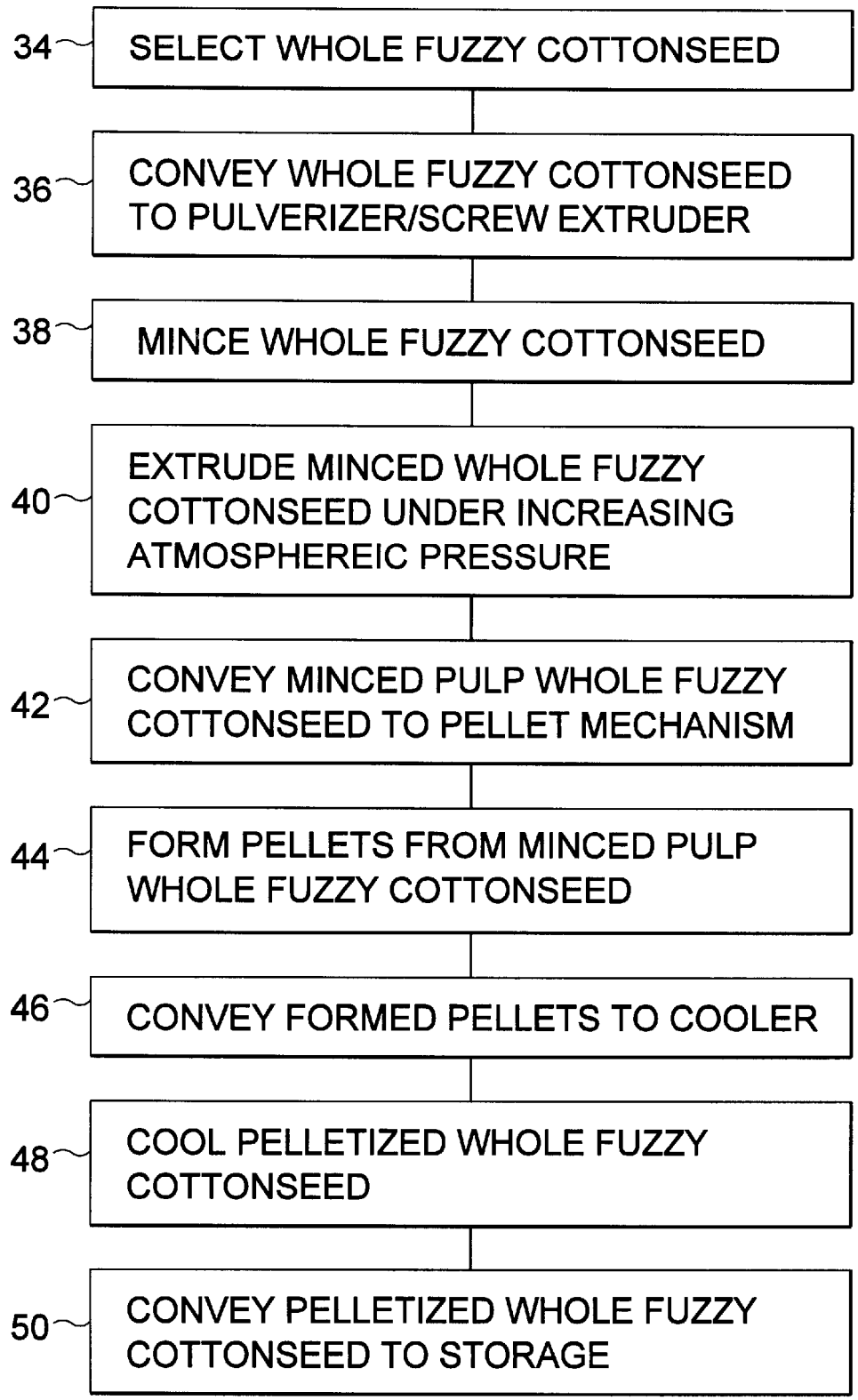
FIG. 2 is a block diagram of the preferred method of pelletizing whole fuzzy cottonseed.

The whole fuzzy cottonseed mixture is extruded onto conveyance 22 to the pelletizer 24 where it will be formed into predetermined pellet sizes. After the pellet forming process 24 the pellets will be conveyed 26 to a cooler 28 for a reduction of the pellet temperature. After sufficient temperature reduction the pellets will be conveyed 30 to a finished pellet storage container 32. Referring to FIG. 2, shows the preferred method for turning linted or whole fuzzy cottonseed into animal feed pellets. The cottonseed having a hull having residual fibers attached thereto can not be handled by normal grain handling equipment because of these hull attached fibers which have a tendency to bind with other seed hull fibers and thereby clump and clog the machinery.

Therefore, the method of the present invention takes these whole fuzzy cottonseeds 34 and meters 36 them to a screw extruder. The purpose of the screw extruder is to mince 38 the seeds and attached fibers into a smaller particulate mixture of the seed and fibers. As the seeds are automatically reduced to a predetermined particle size the mixture is advanced by the screw to the screw extruder output port. Under ever increasing atmospheric pressure the mixture is compressed causing rupturing and temperature increases within the mixture resulting in an extruded mash 40. The hot oatmeal-like mixture is conveyed 42 to the pellet forming mechanism 44. The pellet forming mechanism will form the mixture into predetermined sizes as required. The hot pellets are conveyed 46 to the cooler. The cooler 48 will reduce the temperature of the pellets before conveying 50 the pelletized fuzzy cottonseed pellets to storage.

While the aforementioned method will turn whole fuzzy cottonseed into densified pellets that can be handled in similar fashion as other grain product, it would normally be desirable to enhance the nutritional content of the pellets and to protect the pellets from insects and rodents. As will be described later.

Figure 3:
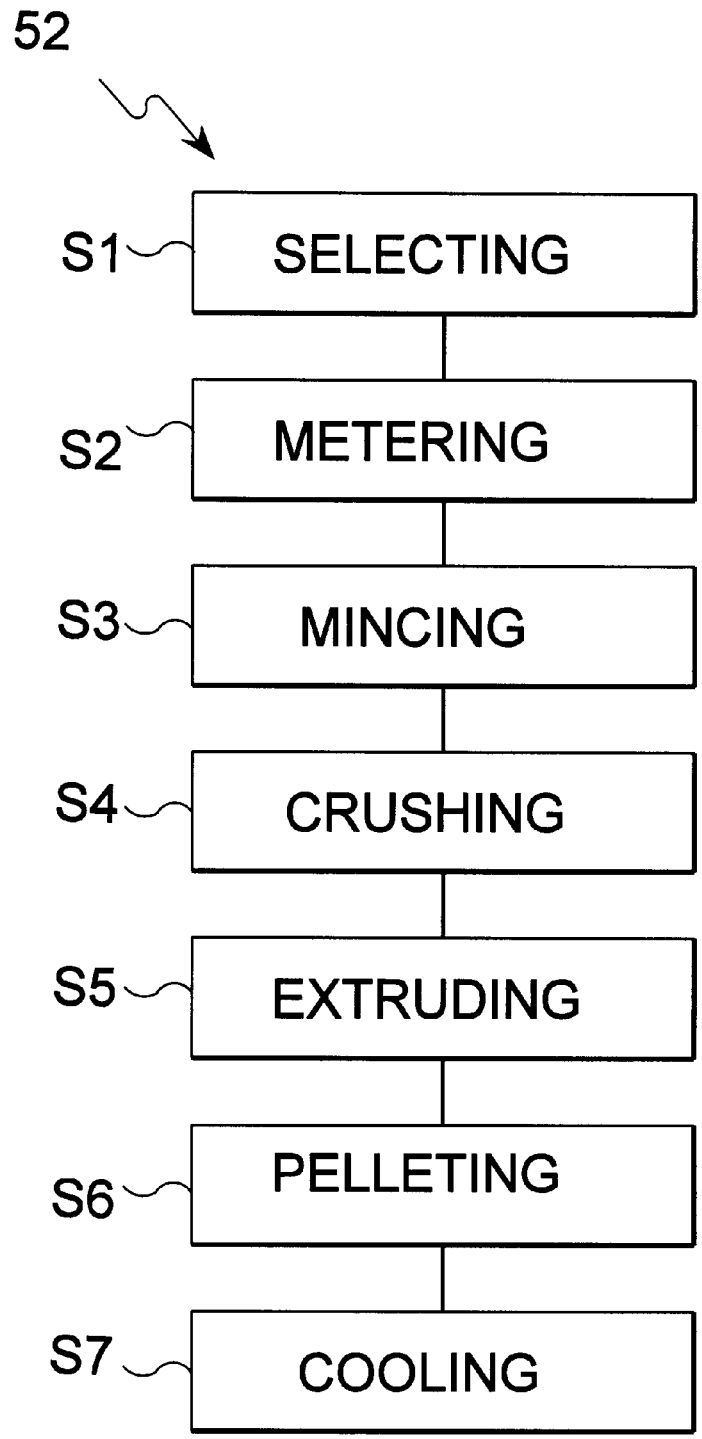
FIG. 3 is a block diagram of the steps for creating pelletized whole fuzzy cottonseed.

Referring to FIG. 3, shows the steps of the present invention for producing whole fuzzy cottonseed pellets from whole fuzzy cottonseed. Step 1 S1 selecting is a process well known within the art whereby the ginning of cotton results in the removal of all seed material. The seeds can be further processed to cull the most desirable seeds from the seed aggregate for next crop planting. The remainder of the seed aggregate can be used as animal feed. (S2) Step 2 takes the seeds selected for feed and meters them at a specific rate to a machine that will reduce the selected seeds to a mixture that can be pellet formed. (S3) Step 3 takes the metered seeds and minces them by means of a bladed screw until the seeds and attached fibers have been reduced to a smaller seed particle aggregate. As the bladed screw moves the material toward the output port of the screw extruder, the minced seed aggregate is compressed under increasing atmospheric pressure. (S4) Step 4 the increasing atmospheric pressure crushes the seed particle aggregate into a hot whole fuzzy cottonseed mash. (S5) Step 5 the whole fuzzy cottonseed mash is extruded from the screw extruder which has reduced the whole fuzzy cottonseed aggregate into a hot pelletizable mash. (S6) Step 6, the hot whole fuzzy cottonseed mash is processed through a pellet forming machine into predetermined sized pellets. (S7) Step 7, the selectively sized hot pellets are cooled by cooling machinery.

While it has been determined that whole fuzzy cottonseed is a desirable animal feed, the fibers attached to the seeds has prevented their common use as an animal feed. There are products presently available that either coat the seed in a gelatinous starch or subject the seed aggregate to an acid wash to remove the cotton fibers from the seed hulls. Both of these methods increases the processing costs in providing a whole cottonseed feed. The present invention overcomes these undesirable seed aggregate characteristics in a new and novel method.

Mainly the seed aggregate is comprised of hulled seeds having cotton fibers attached thereto. Normal grain handling equipment gets clogged by these fibrous seeds requiring special handling or treatment of the seed, such as acid baths to remove the fibers. While these methods have been successful for their intended purposes, the present invention provides a natural solution by mincing the seeds and attached fibers into smaller a particle matter that is further compressed under pressure to produce a whole fuzzy cottonseed mash that can be formed into pellets.

Figure 4:
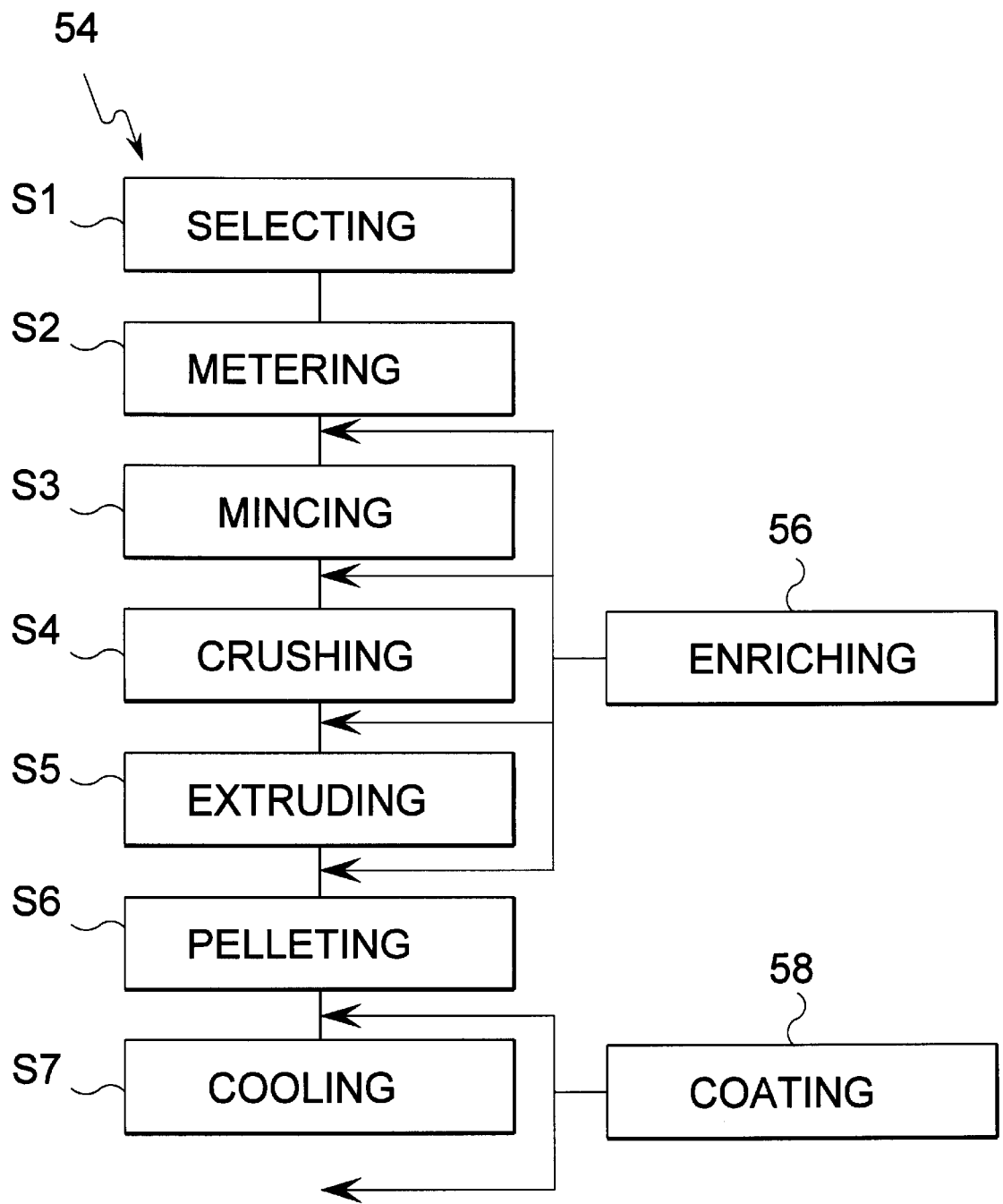
FIG. 4 is a block diagram of the steps for creating enriched and/or coated pelletized whole fuzzy cottonseed.

Referring to FIG. 4, shows the minimal steps of the present invention for producing whole fuzzy cottonseed pellets from whole fuzzy cottonseed as described in FIG. 3. The additional processes shown in FIG. 4 demonstrate additional processes that can be incorporated to enhance the pellets by adding feed supplements, vitamins and medicines. In addition to coating the pellets against insect and vermin infestation. Step 1 S1 selecting is a process well known within the art whereby the ginning of cotton results in the removal of all seed material. The seeds can be further processed to cull the most desirable seeds from the seed aggregate for next crop planting. The remainder of the seed aggregate can be used as animal feed. (S2) Step 2 takes the seeds selected for feed and meters them at a specific rate to a machine that will reduce the selected seeds to a mixture that can be pellet formed. (S3) Step 3 takes the metered seeds and minces them by means of a bladed screw until the seeds and attached fibers have been reduced to a smaller seed particle aggregate. As the bladed screw moves the material toward the output port of the screw extruder, the minced seed aggregate is compressed under increasing atmospheric pressure. (S4) Step 4 the increasing atmospheric pressure crushes the seed particle aggregate into a hot whole fuzzy cottonseed mash. (S5) Step 5 the whole fuzzy cottonseed mash is extruded from the screw extruder which has reduced the whole fuzzy cottonseed aggregate into a hot pelletizable mash. (S6) Step 6, the hot whole fuzzy cottonseed mash is processed through a pellet forming machine into predetermined sized pellets. (S7) Step 7, the selectively sized hot pellets are cooled by cooling machinery.

As shown, the introduction of feed supplements, vitamins, and medicines can occur at one or more selected point depending on the properties that are to be attained. The infusion of additives and preservatives has an added advantage over coating in that the additives will permeate through the pellet. Because these additives are not subjected to atmospheric conditions such as UV rays, they may have a longer shelf life. Also the introduction of greater quantities of additives is possible that is not possible with coatings due to the fact that there is a finite surface area on a seed. The thicker the coating the greater chance of chipping and separation of the coating from the seed.

Furthermore, the pellets can be coated as a final process to protect the pellets from rodents and insects. This final coating would have little effect on the feed supplements, vitamins, and medicines that to a large extent are contained within the pellet.

What is claimed is new and desired to be protected by Letters Patent is set forth in the appended claims:

1. A method for producing pelletized whole fuzzy cottonseed from whole fuzzy cottonseed, the method comprising the steps of:

a) screening linted cottonseed for removal of foreign materials;

b) mincing the screened linted cottonseed and attached fibers in a screw extruder, increasing the pressure as the cottonseed progresses toward an outlet port of said extruder forming a whole fuzzy cottonseed mash elevated in temperature and pressure;

c) infusing the extruded cottonseed prior to pelletizing to enrich the cottonseed with additives and preservatives;

d) pelletizing said mash into predetermined pellet sizes with said additives and preservatives contained within the pellets;

e) cooling the pellets;

f) transferring the pellets to a finished pellet storage container; and g) coating said pellets to protect the pellets from insects and rodents.

* * * * *